United States Patent [19]

Nosek

[11] Patent Number: 4,970,802
[45] Date of Patent: Nov. 20, 1990

[54] WHEELED MEASURING DEVICE

[76] Inventor: Frank J. Nosek, 1236 Whitingham Cir., Naperville, Ill. 60540

[21] Appl. No.: 403,702

[22] Filed: Sep. 6, 1989

[51] Int. Cl.⁵ .............................................. G01B 3/12
[52] U.S. Cl. .................... 33/780; 235/95 B; 33/711; 33/734
[58] Field of Search ................ 33/772, 782, 734, 745, 33/711; 74/325; 235/95 R, 95 B, 105, 109

[56] References Cited

U.S. PATENT DOCUMENTS

| | | | |
|---|---|---|---|
| 1,746,599 | 2/1930 | Mahan | 74/325 |
| 2,636,390 | 4/1953 | Wagner | 74/325 |
| 3,696,510 | 10/1972 | Evans, Jr. | 33/781 |
| 3,728,551 | 4/1973 | Culver et al. | 33/772 |
| 3,835,543 | 9/1974 | Polydoris et al. | 33/781 |
| 4,200,985 | 5/1980 | Culver et al. | 33/772 |

Primary Examiner—William A. Cuchlinski, Jr.
Assistant Examiner—Daniel G. DePumpo
Attorney, Agent, or Firm—Wood, Phillips, Mason, Recktenwald & VanSanten

[57] ABSTRACT

A wheeled measuring device having selectively usable and positionable hub elements for use with a plurality of different measuring wheels and corresponding gearing for utilization of a counter to provide different readouts in effecting desired measurements. The hub elements are received in a recess in the housing of the measuring device and retained therein as a result of securing together of separate portions of the housing of the measuring device in the manufacture thereof.

18 Claims, 2 Drawing Sheets

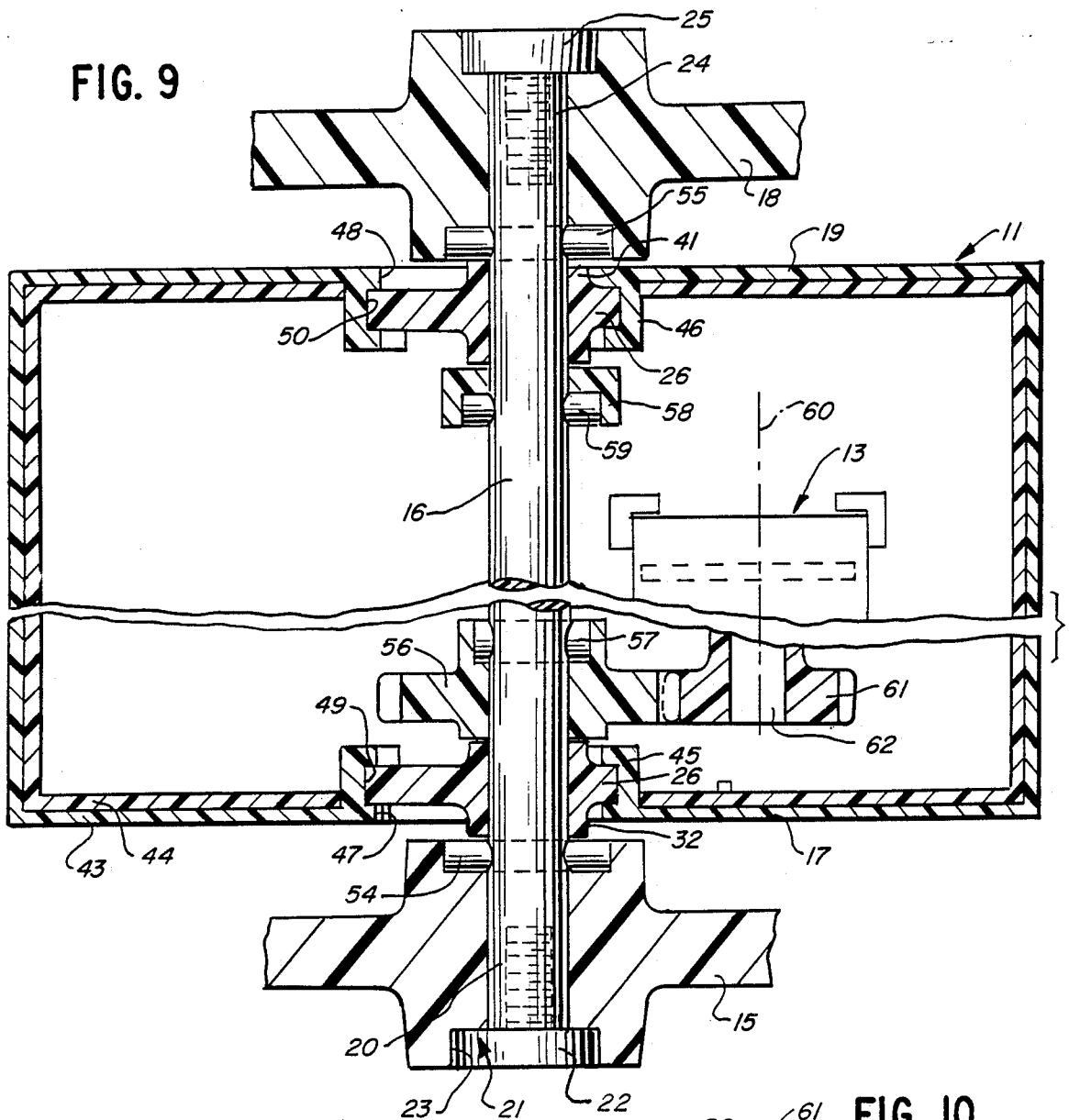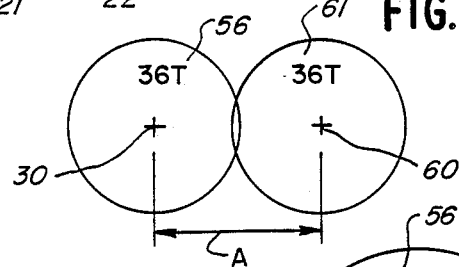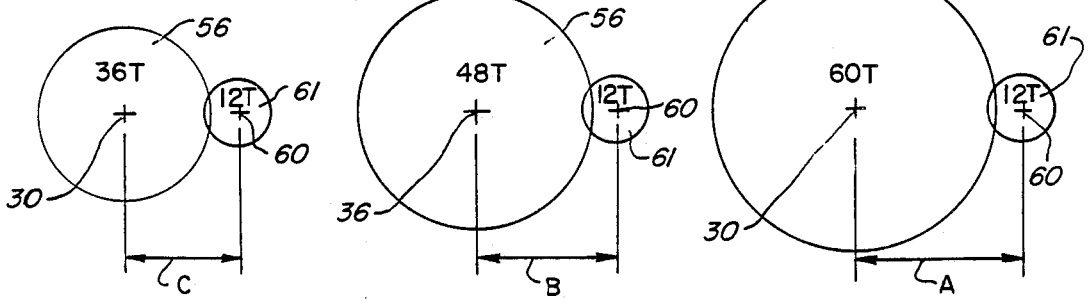

WHEELED MEASURING DEVICE

BACKGROUND OF THE INVENTION

1. Field of the Invention

This invention relates to measuring devices and in particular to wheeled measuring devices, including a counter for indicating the measured distances.

2. Description of the Background Art

In one form of measuring device, a counter is mounted in a housing. The counter shaft is rotated by means of a driven gear thereon which, in turn, is driven by a driver gear mounted on the axle of a wheel journaled in the housing.

A problem arises in the provision of such wheeled measuring devices in that it is desirable to utilize a common form of counter in connection with different types of measurement, such as metric measurements, English system measurements, small increment measurements, and large increment measurements, etc.

SUMMARY OF THE INVENTION

The present invention comprehends an improved wheeled measuring device wherein any one of a different plurality of wheel sizes may be utilized and any one of a plurality of different types of measurements may be effected with one common counter.

More specifically, the invention comprehends the provision of a wheeled measuring device including a support, a counter carried by the support and having a drive shaft defining a shaft axis, a hub element defining a center and an axle bore having an axis spaced from the center, mounting means for mounting the hub element to the support with the center spaced from the shaft axis and selectively (a) in a first disposition wherein the axis bore is located between the hub element center and the drive shaft axis, or (b) the hub element center is located between the axle bore and the drive shaft axis, a driven gear mounted coaxially on the counter drive shaft, an axle journaled in the axle bore, a measuring wheel fixed coaxially to the axle, a driver gear coaxially fixed to the axle, the driver gear being arranged to be in meshed association with the driven gear when the hub element is mounted in one of the first and second dispositions.

In the illustrated invention, the means for mounting the hub element to the support comprises a recess in the support removably receiving the hub element in either of the different dispositions.

As further shown in the illustrated embodiment, the support may comprise a portion of a housing enclosing the counter and defining opposite sidewalls, with a pair of hub elements mounted one each in the sidewalls for journaling the wheel axle.

In one form, a single wheel is utilized at one end of the axle, and in another form, a pair of wheels are mounted one each at opposite ends of the axle outwardly of the housing.

The invention comprehends that a second hub element be mounted in the opposite sidewall of the housing to journal the free end of the axle where a single wheel is utilized, and to permit journaling of the axle adjacent each of the wheels when a pair of wheels is provided at opposite sides of the housing.

By virtue of the ability to mount the hub element in any one of a plurality of different dispositions, a plurality of different sized wheels may be utilized, together with a corresponding one of a plurality of different sized gears for use in driving the counter, whereby a single counter may be utilized with the measuring device utilizing any one of the different sized wheels and for use with providing readouts in different units, such as English units and metric units.

The wheeled measuring device of the present invention is extremely simple and economical of construction, while yet providing the highly improved features discussed above.

BRIEF DESCRIPTION OF THE DRAWING

Other features and advantages of the invention will be apparent from the following description taken in conjunction with the accompanying drawing wherein:

FIG. 9 is a fragmentary horizontal section taken substantially along the line 9—9 of FIG. 2;

FIG. 10 is a schematic diagram illustrating the arrangement of driver and driven gears as utilized in the invention where a one-foot or one-meter wheel is utilized;

FIG. 11 is a schematic diagram illustrating the arrangement of driver and driven gears as utilized in the invention where a three-foot wheel is utilized;

FIG. 12 is a schematic diagram illustrating the arrangement of driver and driven gears as utilized in the invention where a four-foot wheel is utilized; and FIG. 13 is a schematic diagram illustrating the arrangement of driver and driven gears as utilized in the invention where a five-foot wheel is utilized.

DESCRIPTION OF THE PREFERRED EMBODIMENT

Figure 1:
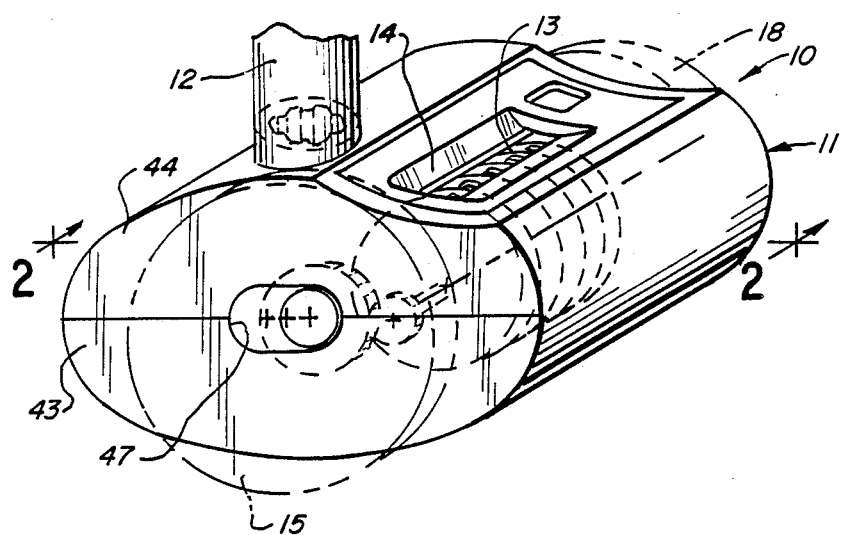
FIG. 1 is a fragmentary perspective view of a wheeled measuring device embodying the invention, with portions of the structure mounted internally of the housing shown in broken lines therein.

In the illustrative embodiment as disclosed in the drawing, a wheeled measuring device generally designated 10 is shown to comprise a housing generally designated 11 secured to the lower end of a handle 12. A conventional counter 13 is mounted in the housing to be viewed through a window 14 in the housing.

The counter is actuated as a result of rotation of a measuring wheel 15 being rolled over a surface to be measured. The measuring wheel is mounted to one end of an axle 16 outwardly of one sidewall 17 of the housing. In the smaller sizes, a single wheel 15 may be utilized, whereas in connection with the use of larger wheels, a pair of such wheels including a second wheel 18 is provided on the opposite end of the axle outwardly of an opposite sidewall 19 of the housing.

In the illustrated embodiment, wheel 15 is secured to end 20 of the axle by a cap screw 21 threaded coaxially into the axle end and including a head portion 22 received in a recess 23 in the wheel. Where the wheel 18 is utilized, wheel 18 is secured to the opposite end 24 of the axle by a similar cap screw 25.

The invention comprehends that any one of a plurality of different sized wheels may be utilized in the measuring device for operating the counter suitably to provide a desired measurement. To accommodate the different sized wheels and the necessary corresponding different gearing arrangement, a plurality of different hub elements is provided and means are incorporated in the device for selectively positioning at least one of the hub elements in any one of a plurality of different positions in the housing.

Figure 3:
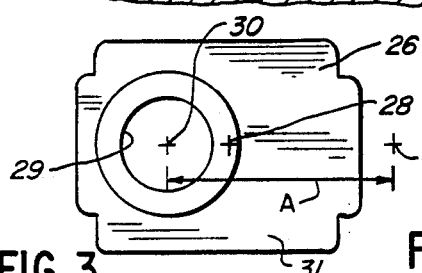
FIG. 3 is a side elevation of a hub element embodying the invention shown in spaced relationship to the axis of the counter shaft.

Thus, as seen in FIGS. 3–8, a first hub element 26 and a second hub element 27 are provided for selective utilization in the wheeled measuring device. The first hub element defines a center 28 and an axle bore 29 having an axis 30 spaced from the center 28, as seen in FIG. 3.

Figure 4:
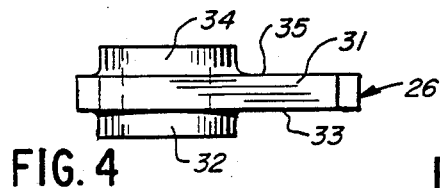
FIG. 4 is a top plan view thereof.
Figure 6:
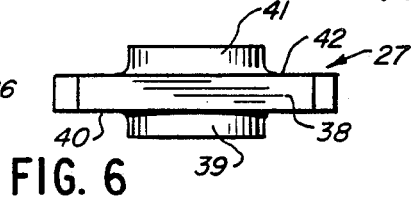
FIG. 6 is a top plan view thereof.
Figure 8:
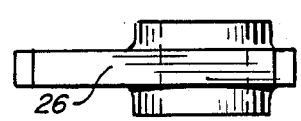
FIG. 8 is a top plan view thereof.

The hub element includes a flat mounting portion 31 and an annular boss 32 projecting from one side face 33 of the flat mounting portion 31. A second annular boss 34 is provided coaxially of boss 32 and projects outwardly from the opposite face 35 of the flat mounting portion, as seen in FIG. 4.

Figure 5:
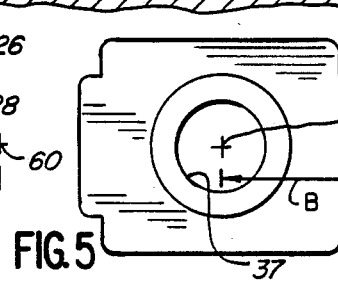
FIG. 5 is a side elevation of another form of hub element embodying the invention shown in relationship to the counter shaft.

Hub element 27, as seen in FIG. 5, defines a center 36 and an axle bore 37 extending axially through center 36. As further illustrated in FIG. 6, hub element 27 includes a flat mounting portion 38, a first annular boss 39 projecting from a first face 40 of the flat mounting portion 38 and a second annular boss 41 projecting outwardly from the opposite face 42 of the flat mounting portion coaxially of boss 39 and center 36.

Housing 11 comprises a split housing having a lower portion 43 and an upper portion 44.

First sidewall housing 17 is provided with a support portion 45 and opposite sidewall 19 is provided with a similar support portion 46 for receiving one each either of the different hub elements and with the hub elements 26 selectively in either of two different dispositions. Thus, more specifically, sidewall 17 is provided with a horizontally elongated opening 47 and sidewall 19 is provided with a corresponding elongated opening 48 through which the boss portions 32 and 41 of the respective hub elements outwardly project when the hub elements are mounted to the supports 45 and 46, respectively. The supports 45 and 46 define similar recesses 49 and 50 receiving selectively positionably the hub elements 26 or selectively the hub element 27, as desired. The hub element flat mounting portions are retained in the recesses by the housing sidewall 17 when the lower and upper portions 43 and 44 are secured together in the enclosing relationship of FIG. 1. The invention comprehends that the two housing portions be secured by suitable means, such as bonding, and, in the illustrated embodiment, are secured together by adhesive means 51 along the confronting joint surfaces 52 and 53.

The hub elements, as seen relative to hub element 26 in FIG. 9, are retained against axial displacement outwardly from the housing by pins 54 and 55, respectively, which cooperate with the cap screws 21 and 25 in retaining the wheels against axial displacement on the opposite ends of the axle. Hub element 26 is retained against axial inward movement by a gear 56, in turn, held against inward displacement on the axle by a pin 57. Hub element 26 is retained against inward displacement on the axle by a collar 58 and cooperating pin 59. In addition, each of the hub elements is retained against axial displacement relative to the housing by the encircling of the edge portion thereof by the housing defining the recesses 49 and 50.

Thus, when the housing is closed, the hub elements are secured in the support portions thereof automatically by the engagement of the housing portions against the edge surfaces of the hub elements in the recesses 49 and 50.

Figure 7:
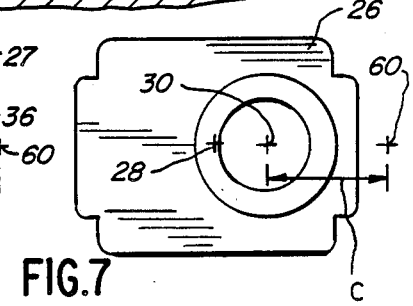
FIG. 7 is a side elevation of the hub element of FIG. 3, in a reverse disposition, showing a different relationship to the counter shaft.

As best seen in FIGS. 3 and 7, hub element 26 may be selectively disposed with the axle bore axis 30 disposed intermediate the center 28 of the hub member, or with the center 28 disposed intermediate the bore axis 30 so as to provide two different displacements of the bore from the counter axis 60. Alternatively, when the hub element 27 is utilized, the axle bore axis 36 is disposed at a still further different spacing from the counter shaft axis 60 so that three different spacings of the axle bore axis from the counter shaft axis may be obtained by suitable selective disposition of either the hub elements 26 or 27 in the disposition shown in FIGS. 3, 5 and 7. The distances between the axes of the axle bores 29, 37 and shaft axis 60 is identified as A, B, and C in FIGS. 3, 5 and 7. Exemplary dimensions are as follows: A=1.25"; B=0.937"; and C=0.750". These corresponding distances are similarly identified in FIGS. 10–13. These dispositions are also shown in broken lines in FIG. 2.

The invention comprehends that the gear 56 be any one of a plurality of different sized gears for cooperation with any one of a plurality of different sized driven gears 61 on the counter shaft 62.

Illustratively, as seen in FIGS. 10–13, gear 56 may comprise a 36-tooth gear cooperating with a 36-tooth gear 61 on the counter shaft, where the wheel 15 is a one-foot or one-meter wheel.

Alternatively, where a three-foot wheel is utilized, the gear 56 may comprise a 36-tooth gear, whereas the counter shaft 61 may comprise a 12-tooth gear, as seen in FIG. 11.

Still further, alternatively, where the wheel is a four-foot wheel, the gear 56 may comprise a 48-tooth gear and the counter shaft gear 61 may comprise a 12-tooth gear, as shown in FIG. 12.

Figure 2:
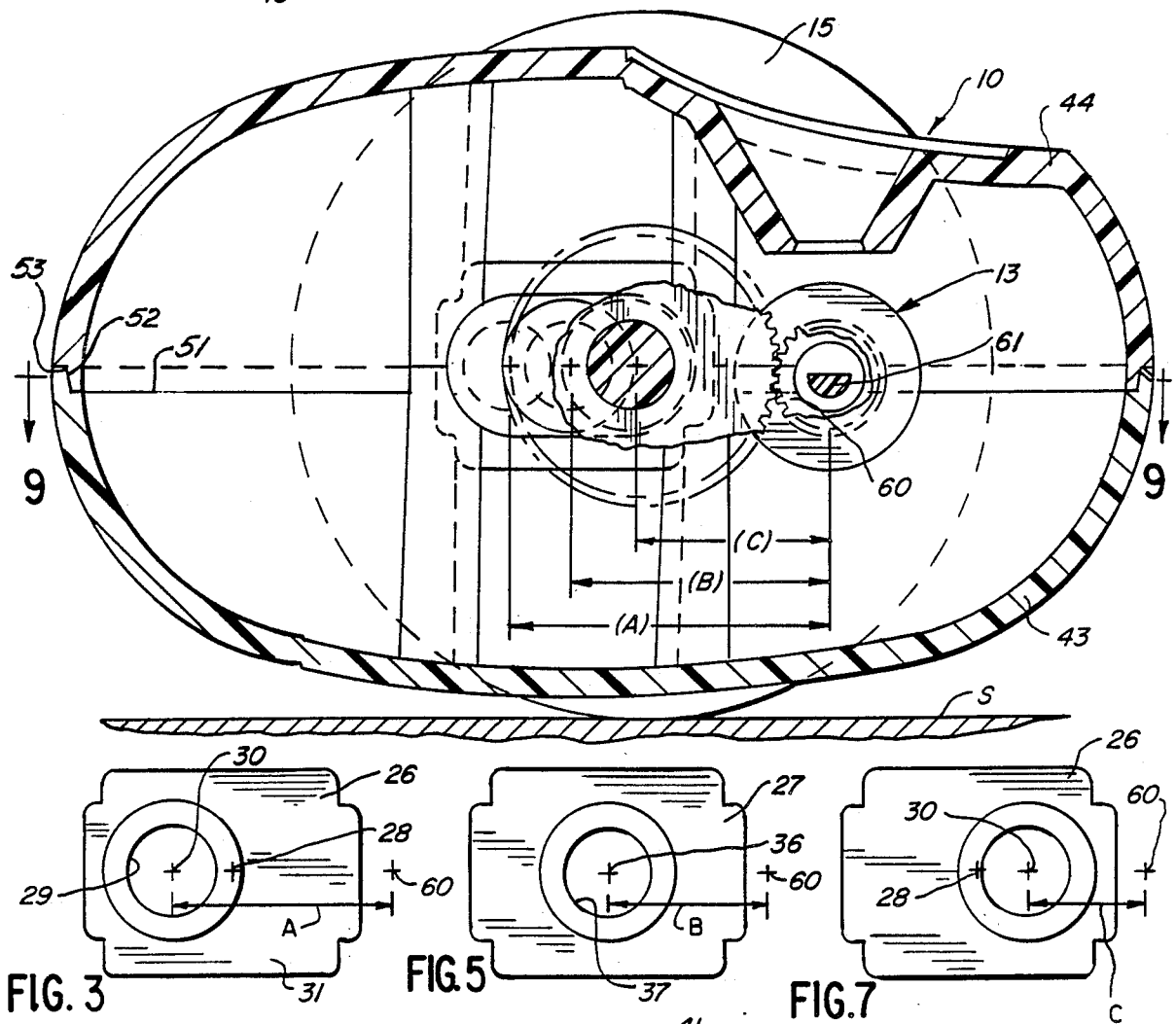
FIG. 2 is a fragmentary enlarged vertical section taken substantially along the line 2—2 of FIG. 1.

As shown in FIG. 13, still further alternatively, where the wheels 15 and 18 comprise a five-inch wheel, the driver gear 56 may comprise a 60-tooth gear and the driven counter shaft gear 61 may comprise a 12-tooth gear. In the illustrated embodiment, the spacing between the axle bore axis and the counter shaft axis may vary suitably to provide the desired meshing of the respective gears, as indicated in FIGS. 10–13. Thus, the selective disposition of the hub element 26 in the dispositions of FIGS. 3 or 7 or the use of the hub element 27 in the disposition of FIG. 5 provide for a plurality of different drive arrangements for the counter coordinated with the different sized wheels so as to permit the use of the wheeled measuring device to provide a wide range of different readouts and the use of the desired size wheels in efficiently effecting the desired measurements along the surface S, as seen in FIG. 2.

The provision of the hub element in the support portion of the housing is readily effected in the different dispositions by simple insertion thereof as desired, with the securing of the housing portions together effectively retaining the hub elements in the desired disposition appropriate for the selected wheel and gear arrangement. Thus, the same general structure may be utilized in providing a wide range of different readouts as desired by the user by simple selective utilization of different wheels hub elements and gears. Resultingly, facilitated manufacture and stocking permit the wheeled measuring device 10 to provide a substantial improvement in the measuring art.

I claim:

1. A wheeled measuring device comprising:
   a support;
   a counter carried by the support and having a drive shaft defining a shaft axis;
   a hub element defining a center and an axle bore having an axis spaced from said center;
   mounting means for mounting said hub element to said support with said center spaced from said shaft axis and selectively (a) in a first disposition wherein said axle bore is located between said hub element center and said drive shaft axis, or (b), said hub element center is located between said axle bore and said drive shaft axis;
   a driven gear mounted coaxially on said counter drive shaft;
   an axle journaled in said axle bore;
   a measuring wheel fixed coaxially to said axle;
   a driver gear coaxially fixed to said axle, said driver gear being arranged to be in meshed association with said driven gear when said hub element is mounted in one of said first and second dispositions.

2. The wheeled measuring device of claim 1 wherein said driver gear is arranged to be in meshed association with said driven gear when said hub element is mounted in said first disposition.

3. The wheeled measuring device of claim 1 wherein said driver gear is arranged to be in meshed association with said driven gear when said hub element is mounted in said second disposition.

4. The wheeled measuring device of claim 1 wherein said means for mounting the hub element to the support comprises a recess in the support removably receiving the hub element in either of said first and second dispositions.

5. The wheeled measuring device of claim 1 wherein said support comprises a housing and said means for mounting the hub element to the support comprises a recess in the housing removably receiving the hub element in either of said first and second dispositions.

6. The wheeled measuring device of claim 1 further including a second hub element selectively received in said mounting means in lieu of said first named mounting means and defining a center and an axle bore having an axis at said center and selectively coaxially receiving said axle and a second driver gear coaxially fixed to said axle, said second driver gear being arranged to be in nested engagement with said driven gear when said second hub element is mounted in said mounting means with said axle mounted in said second hub element.

7. A wheeled measuring device comprising:
   a split housing defining a mounting recess;
   a counter carried by the housing and having a drive shaft defining a shaft axis;
   a hub element defining a center and an axle bore having an axis spaced from said center, said hub element being mounted to said housing in said recess with said center spaced from said shaft axis and selectively (a) in a first disposition wherein said axle bore is located between said axle bore and said drive shaft axis, or (b), said hub element center is located between said axle bore and said drive shaft axis;
   a driven gear mounted coaxially on said counter drive shaft;
   an axle journaled in said axle bore;
   a measuring wheel fixed coaxially to said axle;
   a driver gear coaxially fixed to said axle, said driver gear being arranged to be in meshed association with said driven gear when said hub element is mounted in one of said first and second dispositions.

8. The wheeled measuring device of claim 7 wherein said housing defines a split plane and said axle bore axis lies in said plane.

9. The wheeled measuring device of claim 7 wherein said housing defines a split plane and said axle bore axis lies in said plane, said counter drive shaft axis lying substantially in said plane.

10. The wheeled measuring device of claim 7 wherein said split housing comprises housing portions bonded to each other.

11. The wheeled measuring device of claim 7 wherein said split housing comprises housing portions bonded to each other by adhesive.

12. A wheeled measuring device comprising:
    a support;
    a counter carried by the support and having a drive shaft defining a shaft axis;
    a hub element defining an axle bore, said hub element including a flat mounting portion defining opposite faces and being mounted to said support and an annular boss projecting from one face of said flat mounting portion, said axle bore extending coaxially through said boss and said mounting portion;
    mounting means for mounting said hub element to said support selectively in any one of a plurality of different dispositions;
    a driven gear mounted coaxially on said counter drive shaft;
    an axle journaled in said axle bore;
    a measuring wheel fixed coaxially to said axle;
    a driver gear coaxially fixed to said axle, said driver gear being arranged to be in meshed association with said driven gear when said hub element is mounted in only one of said different dispositions.

13. The wheeled measuring device of claim 12 wherein said hub element is formed of molded synthetic resin.

14. The wheeled measuring device of claim 12 wherein said hub element includes a second annular boss coaxially of said first named boss and projecting from the opposite face of the flat mounting portion.

15. The wheeled measuring device of claim 12 wherein said support defines a pair of spaced sidewalls and said mounting means is provided in one of said sidewalls.

16. The wheeled measuring device of claim 12 wherein said support defines a pair of spaced sidewalls and said mounting means is provided in one of said sidewalls, and further including a second hub element mounted coaxially of said first named hub element in a second mounting means mounted in the other of said sidewalls.

17. The wheeled measuring device of claim 12 wherein said support defines a pair of spaced sidewalls and said mounting means is provided in one of said sidewalls, and further including a second hub element mounted coaxially of said first named hub element in a second mounting means mounted in the other said sidewalls, and a second measuring wheel mounted to said axle outwardly of the support at said second hub element.

18. The wheeled measuring device of claims 12 wherein said measuring wheel comprises a selected one of a plurality of different sized wheels and said driver gear comprises a selected one of a plurality of different sized driven gears corresponding to the selected wheels.

* * * * *